United States Patent
Jeong et al.

(10) Patent No.: US 9,170,350 B2
(45) Date of Patent: Oct. 27, 2015

(54) LENS WITH BROADBAND ANTI-REFLECTIVE STRUCTURES FORMED BY NANO ISLAND MASK AND METHOD OF MAKING THE SAME

(71) Applicant: KAIST (Korea Advanced Institute of Science and Technology), Daejeon (KR)

(72) Inventors: Ki-Hun Jeong, Daejeon (KR); Hyukjin Jung, Daejeon (KR)

(73) Assignee: KAIST (Korea Advanced Institute of Science and Technology), Daejeon (KR)

( * ) Notice: Subject to any disclaimer, the term of this patent is extended or adjusted under 35 U.S.C. 154(b) by 303 days.

(21) Appl. No.: 13/685,550

(22) Filed: Nov. 26, 2012

(65) Prior Publication Data

US 2013/0155522 A1    Jun. 20, 2013

(30) Foreign Application Priority Data

Nov. 24, 2011 (KR) .......................... 10-2011-0123400

(51) Int. Cl.
| | |
|---|---|
| G02B 3/00 | (2006.01) |
| G02B 27/10 | (2006.01) |
| G02B 3/02 | (2006.01) |
| G02B 1/118 | (2015.01) |
| B82Y 20/00 | (2011.01) |

(52) U.S. Cl.
CPC ........ *G02B 3/02* (2013.01); *G02B 1/118* (2013.01); *G02B 3/00* (2013.01); *G02B 3/0006* (2013.01); *B82Y 20/00* (2013.01)

(58) Field of Classification Search
USPC .......................... 359/619, 642, 664, 708, 900
See application file for complete search history.

(56) References Cited

U.S. PATENT DOCUMENTS 7,529,026 B2 * 5/2009 Gardner et al. ............... 359/619

FOREIGN PATENT DOCUMENTS

| KR | 1020100097369 | 9/2010 |
|---|---|---|
| WO | WO 2012/018163 | 2/2012 |

* cited by examiner

*Primary Examiner* — Jack Dinh
(74) *Attorney, Agent, or Firm* — IP & T Group LLP

(57) ABSTRACT

The present invention provides a lens having broadband anti-reflective nanostructures formed using nano-island masks and a method for making the same, in which nanostructures having a size and period equal to or smaller than the light wavelength are formed on the surface of a lens to obtain a lens having decreased reflectance, increased transmittance and high efficiency. The lens having broadband anti-reflective nanostructures formed using nano-island masks comprises: a lens having a planar shape or a predetermined curvature; and anti-reflective nanostructures formed on one surface of the lens using nano-island masks, in which the horizontal and vertical cross-sections of the anti-reflective nanostructures have a size equal to or smaller than the light wavelength.

10 Claims, 11 Drawing Sheets

LENS WITH BROADBAND ANTI-REFLECTIVE STRUCTURES FORMED BY NANO ISLAND MASK AND METHOD OF MAKING THE SAME

CROSS-REFERENCE TO RELATED APPLICATIONS

The present application claims priority of Korean Patent Application No. 10-2011-0123400 filed on Nov. 24, 2011. The disclosure of each of the foregoing applications is incorporated herein by reference in its entirety.

BACKGROUND OF THE INVENTION

1. Field of the Invention

The present invention relates to a lens having broadband anti-reflective nanostructures formed using nano-island masks and a method for making the same, and more particularly to a lens having broadband anti-reflective nanostructures formed using nano-island masks and a method for making the same, in which nanostructures having a size and period equal to or smaller than the light wavelength are formed on the surface of a lens to obtain a lens having decreased reflectance, increased transmittance and high efficiency.

2. Description of the Related Art

As used herein, the term "microlens" refers to a lens having a diameter ranging from about 1 μm to a few mm. The microlens is used as an optical device in the fields of telecommunication devices, medical devices, optical sensors and photo-electric devices, which include connections between optical devices such as planar lightwave circuits (PLCs), laser diodes (LDs) and photodiodes (PDs). Such microlenses can be classified into gradient index lenses, spherical surface microlenses, array lenses, Fresnel lenses and the like, and are made by a method such as molding, ion exchange, diffusion polymerization, sputtering or etching.

In addition, the microlenses are necessarily used for the purpose of increasing the light-receiving efficiency of image sensors, such as CCD (charge coupled device) or CMOS (complementary metal oxide semiconductor), by using the light-receiving characteristics of the microlenses. These microlenses are made by a thermal reflow or resist melting method based on the thermoplastic properties of polymer materials. The reflection of light resulting from the difference in refractive index between the microlens and air reduces the light-gathering efficiency of the microlens.

Generally, high-transmittance lenses having low reflectance compared to microlenses are made using anti-reflective coating. In a known method for making a high-transmittance lens, an anti-reflective film consisting of a multilayer structure of an oxide layer, a nitride layer and the like is formed on the surface of a microlens. The anti-reflective film serves to increase the light transmittance of an optical device while reducing the light reflectance.

However, this anti-reflective coating technology according to the prior art has shortcomings in that the anti-reflective film becomes mechanically unstable as temperature changes, it is difficult to find a coating material suitable for the intended use, and the cost of the coating material is expensive to increase the production cost. In addition, the method for forming the multilayer anti-reflective film has problems in that it requires a special medium having a very low refractive index and employs a complex process, and thus the overall efficiency of the process is reduced.

Accordingly, there has been an increasing demand for new technology for the above-described conventional anti-reflective coating technology, and according to this demand, technology for forming an anti-reflective structure was suggested as an alternative for the conventional anti-reflective coating technology. In other words, the technology for forming the anti-reflective structure has advantages over the conventional anti-reflective coating technology in that the anti-reflective structure can be made at a relatively low cost, can be used in a wider wavelength range and can provide anti-reflective effects over a wider incident angle.

Examples of conventional methods for forming this anti-reflective structure include a lithography-based method. However, this method has shortcomings in that much cost and time are required and it is difficult to form the anti-reflective structure over a large area on a spherical surface.

Thus, it is preferable to a novel method capable of making a plastic lens having an anti-reflective structure, which overcomes the problems of the above-described conventional lithography-based method and can produce the plastic lens in large amounts. However, an apparatus or a method, which satisfies all the above-described requirements, has not yet been provided.

Accordingly, the present inventors have conducted studies to develop a lens having decreased reflectance, increased transmittance and high efficiency, and as a result, have found that, when an anti-reflective layer having nano-structures is formed on the lens surface, a lens can be produced in a simple manner in large amounts, thereby completing the present invention.

SUMMARY OF THE INVENTION

According to the present invention, nanostructures having a size and period equal to or smaller than the light wavelength are formed on the surface of a lens having a predetermined diameter and curvature, whereby the reflectance of the lens can be reduced, the transmittance of the lens can be increased and a high-efficiency lens can be produced using an anti-reflective effect. In other words, according to the present invention, a different kind of material is not coated onto a lens, unlike the conventional anti-reflective coating method, and an anti-reflective layer having nanostructures formed therein is formed on the lens surface using nano-island masks. Thus, not only an inorganic microlens, but also a polymer microlens having low heat resistance can be produced. When this microlens is used, a lens having light weight and improved impact resistance can be produced, and a high-efficiency lens can be produced at low costs by improving productivity and the easiness of processing.

BRIEF DESCRIPTION OF THE DRAWINGS

Reference will now be made in greater detail to a configuration of the present invention with reference to the accompanying drawings.

DETAILED DESCRIPTION OF PREFERRED EMBODIMENTS

Figure 1:
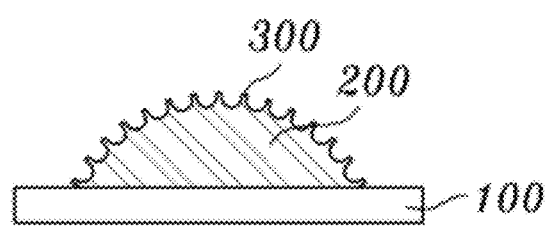
FIG. 1 is a cross-sectional view of a lens having broadband anti-reflective nanostructures formed using nano-island masks according to the present invention.

Hereinafter, embodiments of the present invention will be described in detail with reference to the accompanying drawings. It is to be understood that like elements or components are indicated by like reference numerals, if possible. In the following description, the detailed description of known functions or configurations will be omitted so as not to obscure the subject matter of the present invention.

FIG. 1 is a cross-sectional view of a lens having broadband anti-reflective nanostructures formed using nano-island masks according to the present invention.

As shown in FIG. 1, a lens having broadband anti-reflective nanostructures formed using nano-island masks according to the present invention comprises a lens 200 having a planar shape or a predetermined curvature on a substrate 100, and anti-reflective nanostructures 300 formed on one surface of the lens using nano-island masks, in which the horizontal and vertical cross-sections of the nanostructures 300 have a size equal to smaller than the light wavelength.

The lens 200 may be formed of photoresist, a polymer, silicon, glass or a group III-V semiconductor compound, may consist of a plurality of lenses and may be applied to an image device, an optical sensor or a projection lens. The period of the anti-reflective nanostructures 300 may have a size equal to or smaller than the light wavelength.

Specifically, according to the present invention, a different kind of material is not applied to a lens, unlike the conventional anti-reflective coating method, and the anti-reflective nanostructures according to the present invention may be formed on one surface of the lens 200 using nano-island masks so that the horizontal and vertical cross-sections thereof have a size equal to or smaller than the light wavelength.

Thus, the nanostructures having a size and period equal to or smaller than the light wavelength in the lens according to the present invention can reduce the reflectance of the lens, can increase the transmittance of the lens, and makes it possible to produce a high-efficiency lens by the anti-reflective effect. Accordingly, the number of light sources can be reduced by a number corresponding to an increase in the efficiency of the light sources so as to reduce the production cost and to reduce the generation of heat from the light sources. In addition, because the anti-reflective layer having nanostructures formed therein is formed on the lens surface using the nano-island mask, the lens can be produced in a simple manner in large amounts.

Meanwhile, it is to be understood that the anti-reflective nanostructures according to the present invention may be formed on the lens surface in various shapes without being limited to the shape shown in FIG. 1 and that the lens can also be formed in various shapes in addition to a spherical or non-spherical shape.

Figure 2A:
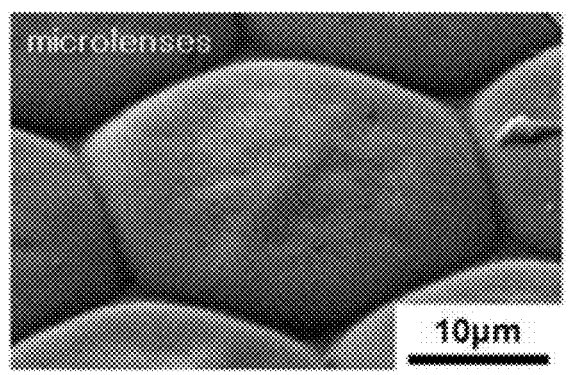
FIG. 2A shows a lens having broadband anti-reflective nanostructures formed using nano-island masks according to the present invention.
Figure 2B:
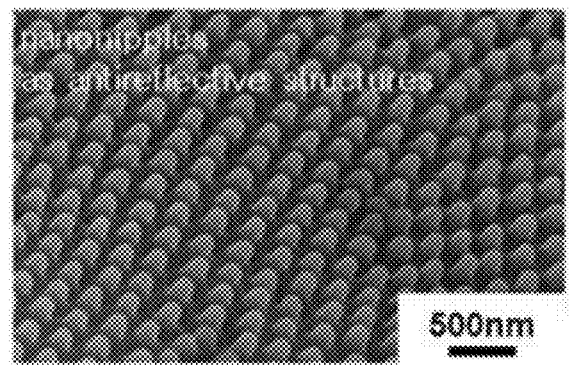
FIG. 2B shows anti-reflective nanostructures in a lens having broadband anti-reflective nanostructures formed using nano-island masks according to the present invention.

FIG. 2A shows a lens having broadband anti-reflective nanostructures formed using nano-island masks according to the present invention, and FIG. 2B shows anti-reflective nanostructures in a lens having broadband anti-reflective nanostructures formed using nano-island masks according to the present invention.

As shown in FIG. 2A, the lens according to the present invention may consist of a plurality of lenses having a predetermined curvature. As shown in FIG. 2B, the anti-reflective nanostructures may be formed in the shape of nanonipples on the lens surface.

Figure 3:
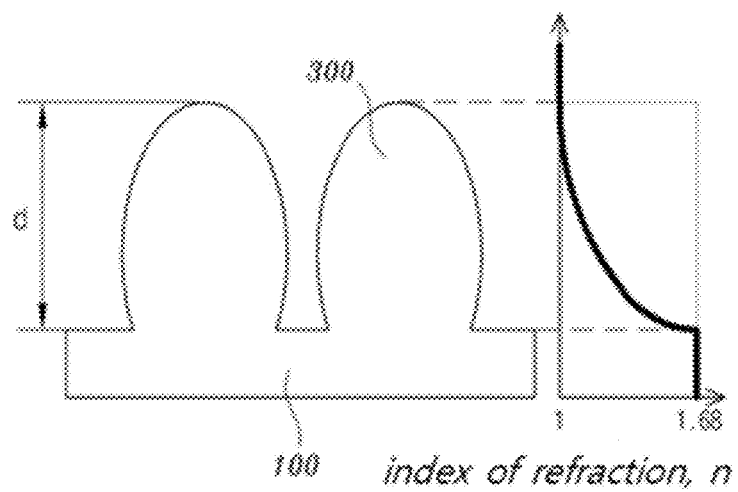
FIG. 3 is a schematic view showing a lens having broadband anti-reflective nanostructures formed using nano-island masks according to the present invention.

FIG. 3 is a schematic view showing a lens having broadband anti-reflective nanostructures formed using nano-island masks according to the present invention.

As shown in FIG. 3, a plurality of the anti-reflective nanostructures 300 are formed on the substrate 100 such that the horizontal and vertical cross-sections and period thereof have a size equal to or smaller than the light wavelength. Thus, the anti-reflective nanostructures 300 can serve to reduce the index of refraction.

For example, when the anti-reflective structures 300 are formed to have a size "d" of 115 nm smaller than a light wavelength of 600 nm, the anti-reflective nanostructures may have a refractive index of 1.3 or less in a state wherein the refractive index of air is 1 and the refractive index of the substrate is 1.68.

Herein, the effective refractive index for reducing the reflectance of the lens can be calculated using the following equation 1:

$$n_{eff} = \sqrt{n_{sub} \times n_{air}}, \quad d = \frac{1}{n_{eff}} \times \frac{\lambda}{4} \qquad \text{Equation 1}$$

wherein $n_{eff}$ is the refractive index of the anti-reflective nanostructures, $n_{sub}$ is the refractive index of the lens, $n_{air}$ is the refractive index of air, d is the size of the anti-reflective nanostructures, and λ is the light wavelength.

As described above, the effective refractive index of the lens surface and the reflectance of the lens can be controlled by the anti-reflective nanostructures. The reflectance of the lens can be controlled by the metal thickness and the heat treatment temperature and time or controlled by the depth or width of etching of the lens using the nano-island mask.

Hereinafter, a method for making a lens having broadband anti-reflective nanostructures using nano-island masks will be described in detail.

Figure 4:
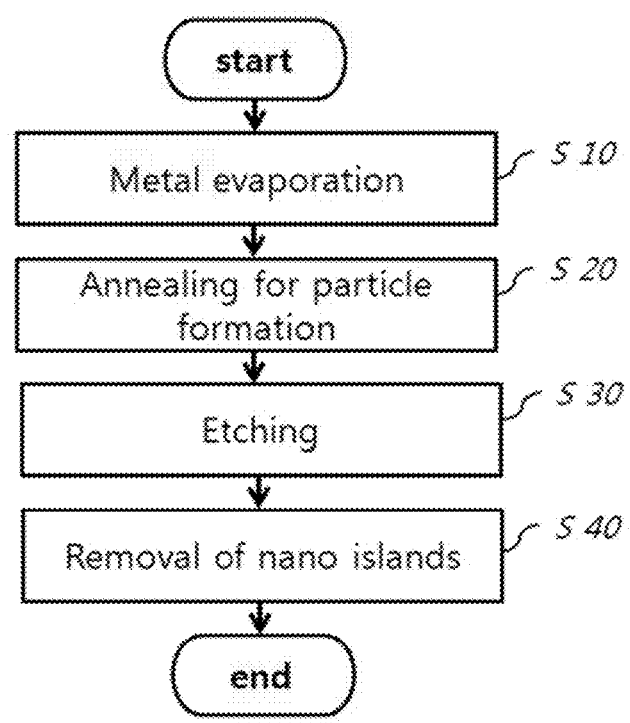
FIG. 4 is a block diagram showing a method for making a lens having broadband anti-reflective nanostructures formed using nano-island masks according to the present invention.

As shown in FIG. 4, a method for making a lens having broadband anti-reflective nanostructures using nano-island masks according to the present invention comprises: a mask material evaporation step S10, a particle formation step S20, an etching step S30, and a nano-island removal step S40.

Figure 5A:
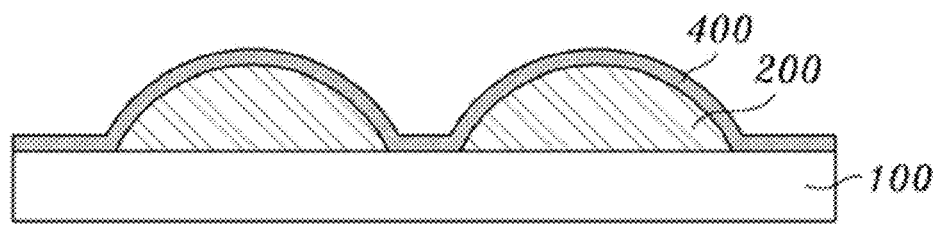
FIG. 5A illustrates the metal evaporation step of the method for making a lens having broadband anti-reflective nanostructures formed using nano-island masks according to the present invention.

FIG. 5A illustrates the metal evaporation step of the method for making a lens having broadband anti-reflective nanostructures formed using nano-island masks according to the present invention.

The mask material evaporation step S10 is a step of applying a metal to the lens surface.

Specifically, as shown in FIG. 5A, the mask material evaporation step S10 is a step of applying a mask material 400 to the surface of the lens 200 on the substrate 100 to form a mask material evaporation layer on the lens. Herein, the substrate 100 may be formed of glass, photoresist, a polymer, silicon or a group III-V semiconductor compound, and the lens 200 may be formed of photoresist, a polymer, silicon, glass or a group III-V semiconductor compound. Further, the kind of photoresist or polymer that is used for the lens of the present invention is not limited, as long as it has heat resistance and may be formed into a predetermined shape.

The mask material 400 that is applied to the lens surface may be any one or more metals selected from the group consisting of metals, including silver, gold, platinum, aluminum, iron, zinc, copper, tin, bronze, brass, nickel, and alloys thereof, or any one or more materials selected from the group consisting of oxides, including $SiO_2$, TEOS (tetraethyl orthosilicate), ITO (indium tin oxide) and $Al_2O_3$, nitrides, including TiN and SiNx, low-molecular-weight compounds such as parylene, polymers, and carbon compounds, including CNTs (carbon nanotubes), graphite and graphene. In addition, the mask material 400 may also be any material that can be formed by heat treatment, laser processing or electromagnetic wave irradiation.

Figure 5B:
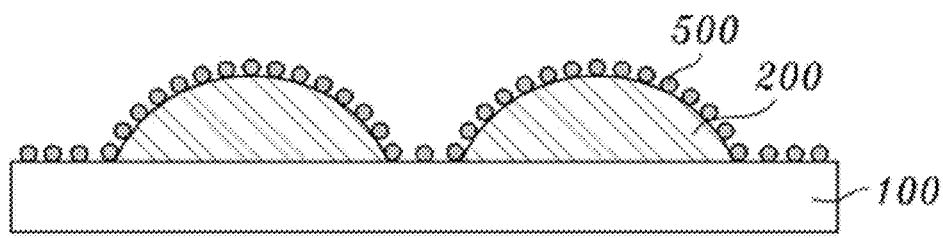
FIG. 5B illustrates the particle formation step of the method for making a lens having broadband anti-reflective nanostructures formed using nano-island masks according to the present invention.
Figure 6A:
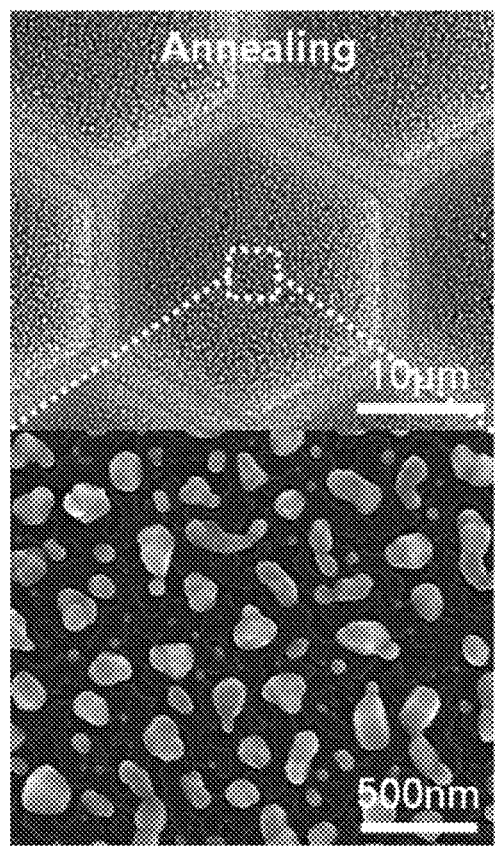
FIG. 6A shows the appearance of the lens after the particle formation step of FIG. 5b.

FIG. 5B illustrates the particle formation step of the method for making the lens having broadband anti-reflective nanostructures formed using nano-island masks according to the present invention, and FIG. 6A shows the appearance of the lens obtained after the particle formation step of FIG. 5b.

The particle formation step S20 is a step of forming the mask material into particles to form nano-islands.

Specifically, as shown in FIG. 5B, the particle formation step S20 is a step of forming the mask material layer on the lens 200 into particles to form nano-islands 500 on the lens. In this step, the mask material can be formed into particles in an atmosphere of any one or more gases of inert gases, including nitrogen, argon, helium, neon, krypton or xenon, or a vacuum or air atmosphere.

Particle formation in the particle formation step may be performed using heat treatment, laser processing or electromagnetic wave irradiation.

The heat treatment in the particle formation step may be performed at a temperature between 30 and 2000° C. If the heat treatment is performed at a temperature lower than 30° C., nano-islands will not be formed, and if it is performed at a temperature higher than 2000° C., the lens will be damaged by thermal damage. Preferably, the heat treatment may be performed at a temperature between 30 and 300° C.

Unlike a conventional process of treating an inorganic lens at high temperature, the particle formation step is a process enabling low-temperature heat temperature and can overcome the shortcoming of the conventional high-temperature polymer lens treatment process in that the optical properties of the polymer lens are significantly deteriorated due to yellowing, the change in the shape, etc.

Meanwhile, FIG. 6A shows the appearance of the lens subjected to the particle formation step.

Figure 5C:
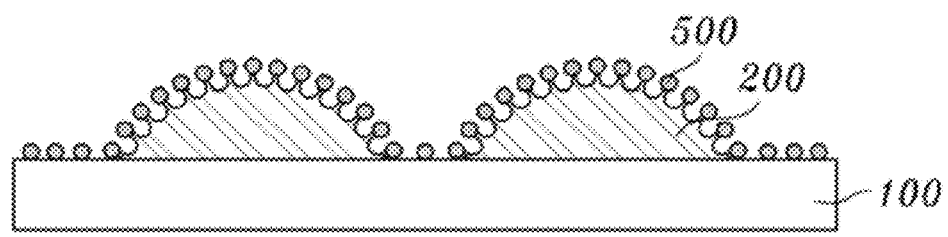
FIG. 5C illustrates the etching step of the method for making a lens having broadband anti-reflective nanostructures formed using nano-island masks according to the present invention.

FIG. 5C illustrates the etching step of the method for making the lens having broadband anti-reflective nanostructures formed using nano-island masks according to the present invention.

The etching step S30 is a step of etching the lens surface using the nano-islands as masks.

Specifically, as shown in FIG. 5C, the etching step S30 is a step of dry-etching the lens surface using the nano-islands formed on the lens 200 as masks. In the etching step S30, the lens surface can be etched using isotropic or anisotropic etching.

Figure 5D:
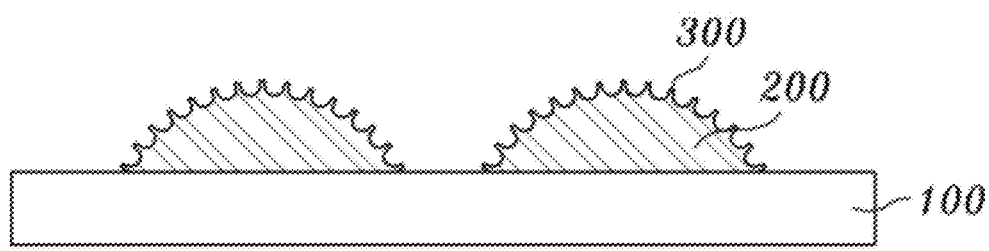
FIG. 5D illustrates the nano-island removal step of the method for making a lens having broadband anti-reflective nanostructures formed using nano-island masks according to the present invention.
Figure 6B:
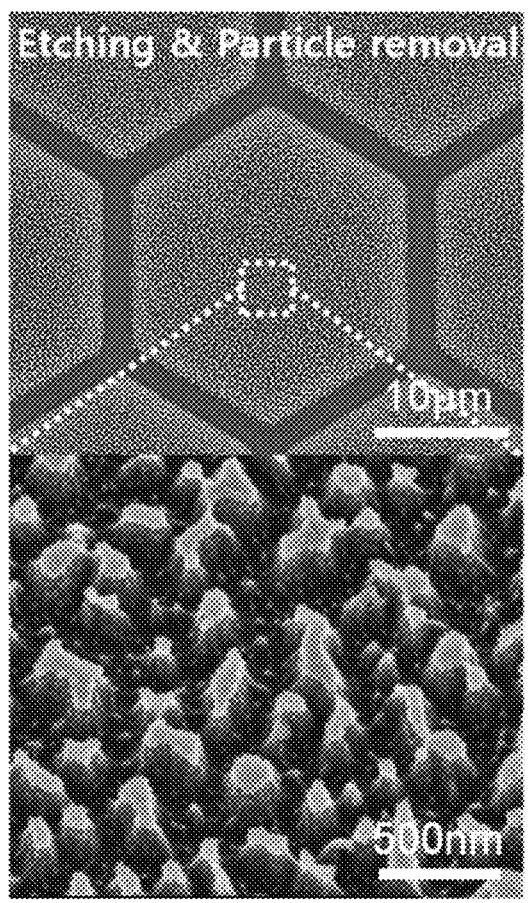
FIG. 6B shows the appearance of the lens after the etching step of FIG. 5C and the nano-island removal step of FIG. 5D.

FIG. 5D illustrates the nano-island removal step of the method for making the lens having broadband anti-reflective nanostructures formed using nano-island masks according to the present invention, and FIG. 6B shows the appearance of the lens after the nano-island removal step of FIG. 5D.

The nano-island removal step S40 is a step of removing the nano-islands from the lens to form anti-reflective nanostructures on the lens.

Specifically, the nano-island removal step S40 is a step of removing the nano-islands from the lens 200 to form the anti-reflective nanostructures 300 on the lens surface. Herein, the horizontal and vertical cross-sections and period of the nanostructures 300 may have a size equal to or smaller than the light wavelength.

Meanwhile, the appearance of the lens after the etching step S30 and nano-island removal step S40 is shown in FIG. 6B.

Figure 7A:
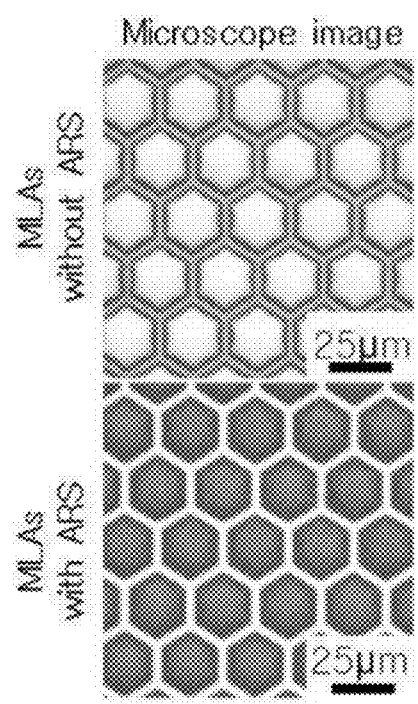
FIG. 7A shows microscopic images of a lens having broadband anti-reflective nanostructures (MLAs with ARS) according to the present invention and a lens having no broadband anti-reflective nanostructures (MLAs without ARS)
Figure 7B:
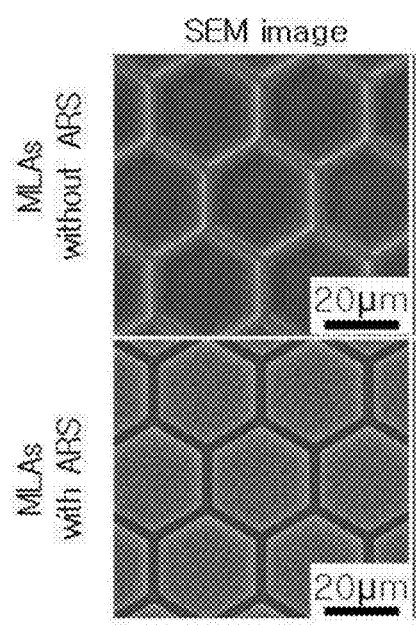
FIG. 7B shows SEM images of a lens having broadband anti-reflective nanostructures (MLAs with ARS) according to the present invention and a lens having no broadband anti-reflective nanostructures (MLAs without ARS)
Figure 7C:
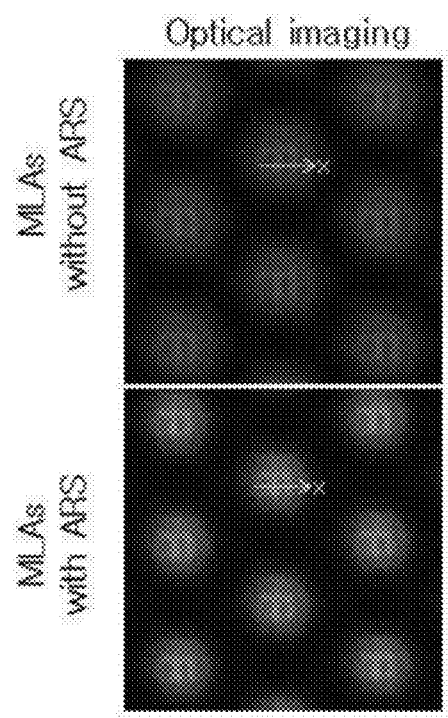
FIG. 7C shows optical images of a lens having broadband anti-reflective nanostructures (MLAs with ARS) according to the present invention and a lens having no broadband anti-reflective nanostructures (MLAs without ARS)

FIGS. 7A to 7C respectively show microscopic images, SEM images and optical images of the lens having broadband anti-reflective nanostructures (MLAs with ARS) according to the present invention and a lens having no broadband anti-reflective nanostructures (MLAs without ARS).

Meanwhile, the microscopic images of the lens having broadband anti-reflective nanostructures (MLAs with ARS) according to the present invention and a lens having no broadband anti-reflective nanostructures (MLAs without ARS) are shown in FIG. 7A, the SEM images are shown in FIG. 7B, and the optical images are shown in FIG. 7c.

Figure 8:
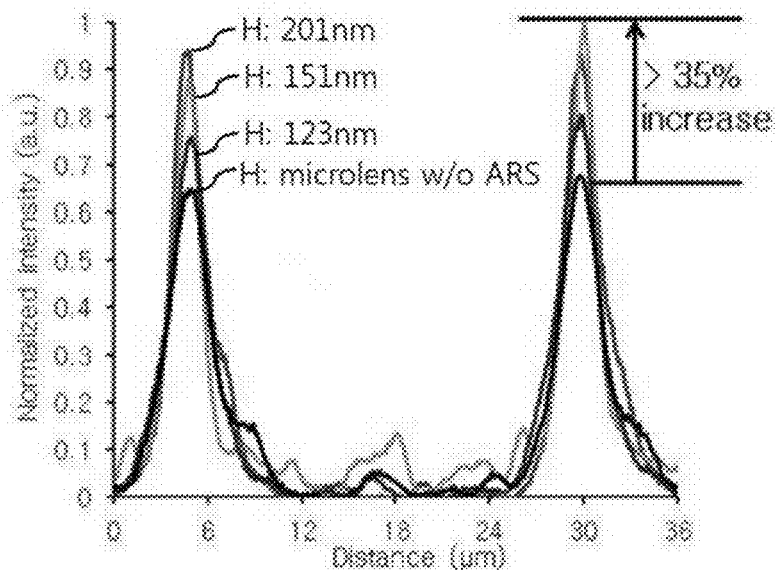
FIG. 8 is a graph showing the increase in photon collection of the lens having broadband anti-reflective nanostructures according to the present invention.
Figure 9:
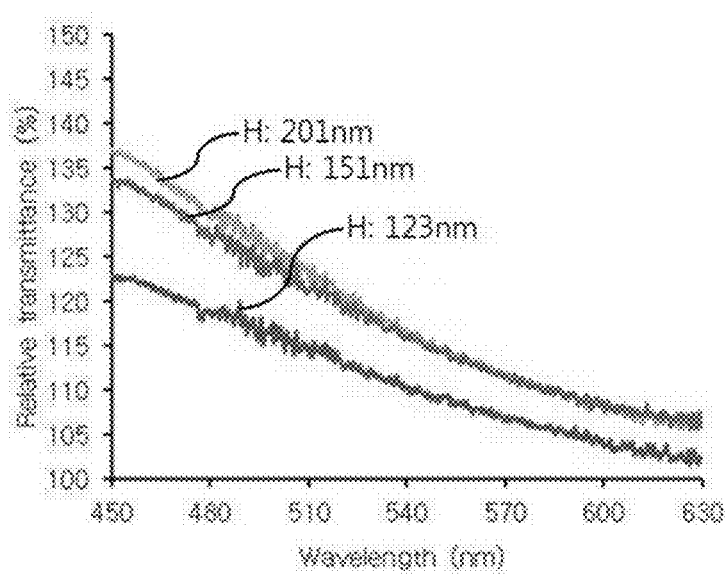
FIG. 9 is a graph showing the increase in transmittance of the lens having broadband anti-reflective nanostructures according to the present invention.
Figure 10:
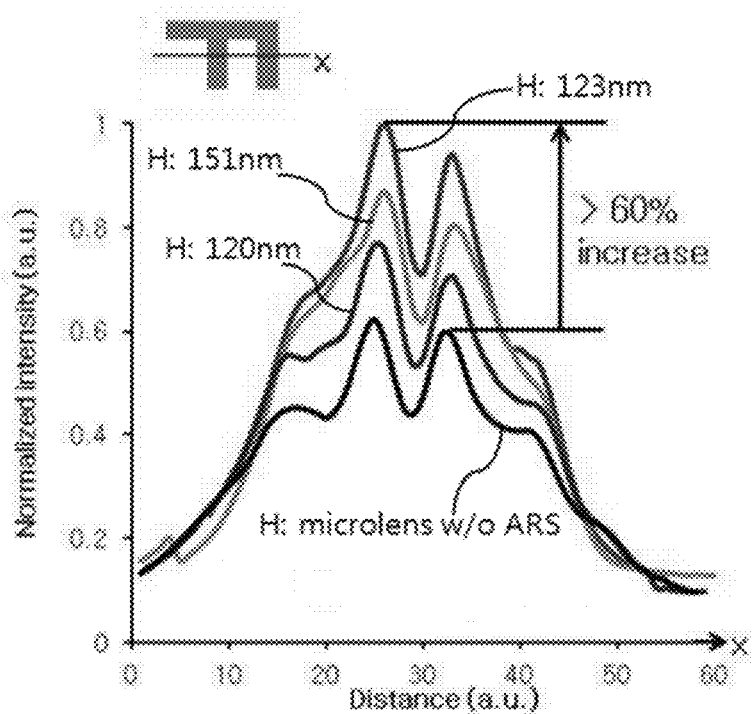
FIG. 10 is a graph showing the increase in image brightness through the lens having broadband anti-reflective nanostructures according to the present invention.

FIG. 8 is a graph showing the increase in photon collection of the lens having broadband anti-reflective nanostructures according to the present invention; FIG. 9 is a graph showing the increase in transmittance of the lens having broadband anti-reflective nanostructures according to the present invention; and FIG. 10 is a graph showing the increase in image brightness through the lens having broadband anti-reflective nanostructures according to the present invention.

As can be seen in FIG. 8, at a light wavelength of 488 nm, the photon collection rate of the lens having broadband anti-reflective nanostructures according to the present invention is higher by up to 35% than that of the lens having no anti-reflective nanostructures. As can be seen in FIG. 9, at a light wavelength of 450 nm, the relative transmittance of the lens according to the present invention is higher by up to 37% than that of the lens having no anti-reflective nanostructures. As can be seen in FIG. 10, in the visible light region, the image brightness through the lens according to the present invention is higher by up to 60% than that of the lens having no anti-reflective nanostructures.

As described above, according to the inventive lens having broadband anti-reflective nanostructures formed using nano-island masks and the method for making the same, nanostructures having a size and period equal to or smaller than the light wavelength are formed on the surface of a lens having a predetermined diameter and curvature, whereby the reflectance of the lens can be decreased and the transmittance of the lens can be increased.

In addition, according to the present invention, a high-efficiency lens can be made using an anti-reflective effect.

Also, according to the present invention, a different kind of material is not applied to a lens, unlike the conventional anti-reflective coating method, and an anti-reflective layer having nanostructures having formed therein is formed on the lens surface using nano-island masks. Thus, the lens can be produced in a simple manner in large amounts.

In addition, according to the present invention, not only an inorganic microlens, but also a polymer microlens having low heat resistance may be produced using a low-temperature process without using a conventional high-temperature process. Thus, according to the present invention, a lens having light weight and improved impact resistance can be produced, and a high-efficiency lens can also be produced at low costs by increasing productivity and the easiness of processing.

Although the inventive lens having broadband anti-reflective nanostructures formed using nano-island masks and the method for making the same have been described with reference to the accompanying drawings, those skilled in the art will appreciate that the scope of the present invention is not limited to the embodiments and drawings disclosed in the specification, and various modifications, additions and substitutions are possible, without departing from the scope and spirit of the invention as disclosed in the accompanying claims.

What is claimed is:

1. A method for making a lens of charge coupled device (CCD) or complementary metal oxide semiconductor (CMOS), the method comprising the steps of:
   providing an organic polymer lens having a curved surface;
   applying mask material to the curved surface of the organic polymer lens;
   heating the mask material at a temperature between 30 to 300 degrees Celsius to transform the mask material into particles, wherein the particles form nano-islands;
   etching the curved surface of the organic polymer lens using the nano-islands as an etching masks; and
   removing the nano-islands from the organic polymer lens to form anti-reflective nanostructures on the organic polymer lens.

2. The method of claim 1, wherein the mask material is selected from the group consisting of silver, gold, platinum, aluminum, iron, zinc, copper, tin, bronze, brass, and an alloy thereof.

3. The method of claim 1, wherein the mask material includes oxide, nitride, low-molecular-weight compound, or a combination thereof,
   wherein the oxide is selected from the group consisting of $SiO_2$, TEOS (tetraethyl orthosilicate), ITO (indium tin oxide), and $Al_2O_3$,
   wherein the nitride is selected from the group consisting of TiN and $SiN_x$,
   wherein the low-molecular-weight compound is selected from the group consisting of parylene, polymers, and carbon compounds, and
   wherein the carbon compound is selected from the group consisting of CNTs (carbon nanotubes), graphite, and graphene.

4. The method of claim 1, wherein the heating of the mask material is performed in an atmosphere including inert gas, in a vacuum, in air atmosphere, and
   wherein the inert gas includes nitrogen, argon, helium, neon, krypton, or xenon.

5. The method of claim 1, wherein the heating of the mask material is performed using heat treatment, laser processing, or electromagnetic wave irradiation.

6. The method of claim 5, wherein the heat treatment is performed using heat or convection current.

7. The method of claim 1, wherein the etching the curved surface of the organic polymer lens is performed using isotropic or anisotropic etching process.

8. The method of claim 1, wherein each of the anti-reflective nanostructures has a size equal to or smaller than the wavelength of incident light entering the organic polymer lens.

9. The method of claim 1, wherein the anti-reflective nanostructures are arranged at uniform interval from each other, and
   wherein the interval between two neighboring anti-reflective nanostructures is equal to or smaller than the wavelength of incident light entering the organic polymer lens.

10. The method of claim 1, wherein the organic polymer lens includes a photoresist lens.

* * * * *